Jan. 18, 1938.  W. FOURNESS  2,105,765
COMPRESSOR SYSTEM
Filed Nov. 4, 1931  2 Sheets-Sheet 1
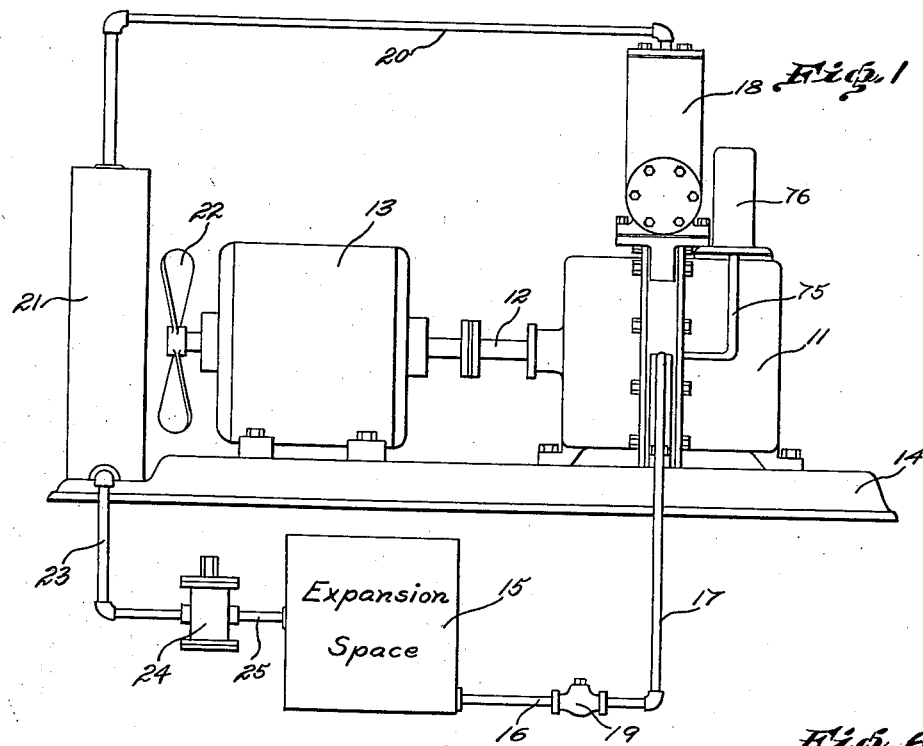
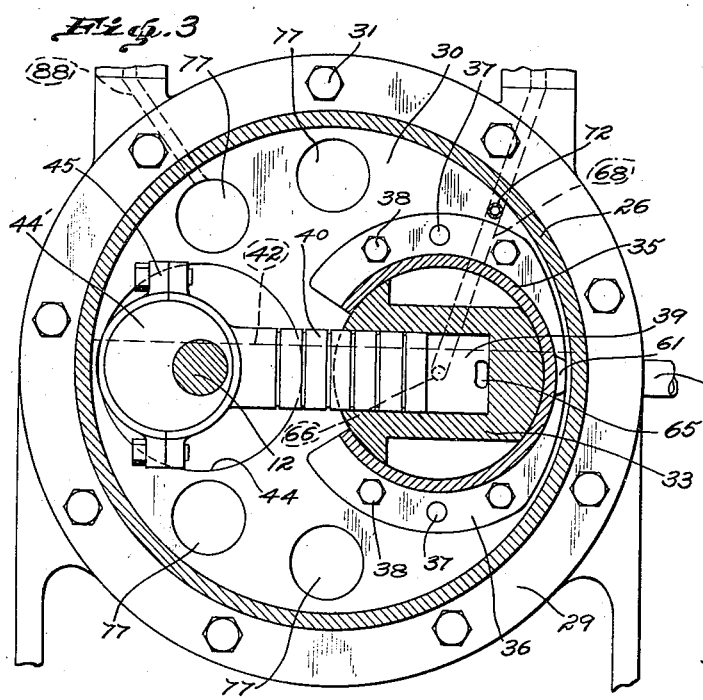
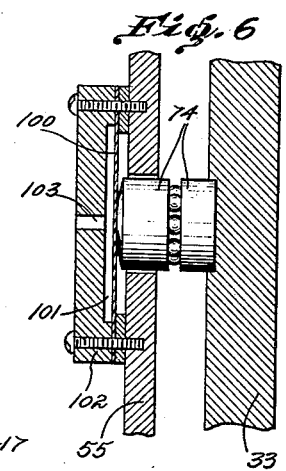
Inventor
Wilfred Fourness
by John Flam
Attorney

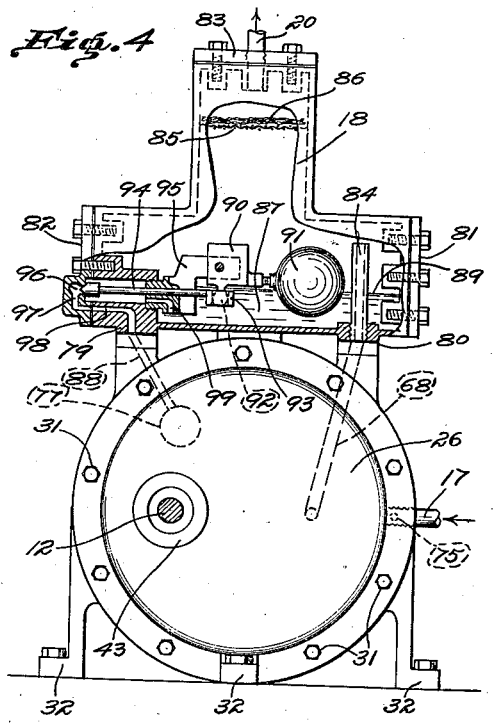
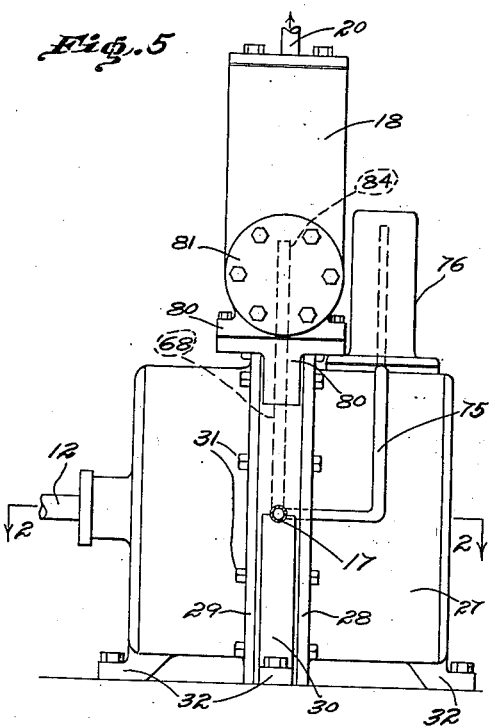
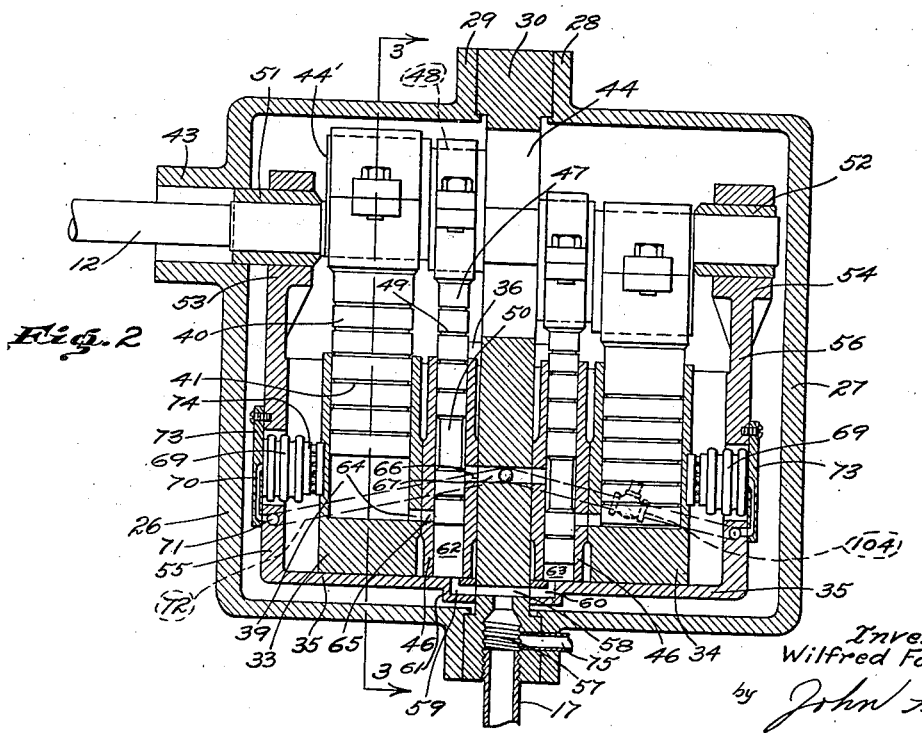

Patented Jan. 18, 1938

2,105,765

UNITED STATES PATENT OFFICE 2,105,765

COMPRESSOR SYSTEM

Wilfred Fourness, Oakland, Calif., assignor, by mesne assignments, to Fourness Development Corporation, Ltd.

Application November 4, 1931, Serial No. 572,952

12 Claims. (Cl. 230—175)

This invention relates to a compressor mechanism, and especially to one capable of being driven at high speed; say at about fifteen hundred to two thousand revolutions per minute.

More particularly, the mechanism is especially adapted to be used for compressing a gas that is used in a mechanical refrigerating system, such as sulfur dioxide. In such systems, the gas is condensed after compression; then it is passed to a refrigerating space, such as expansion coils, by way of a float or expansion valve. In the refrigerating space the liquid rapidly vaporizes and absorbs heat. After vaporization, the gas flows back to the compressor intake, and the cycle is repeated.

An efficient compressor mechanism utilized in this way has been shown and described in my prior application, Serial No. 451,824, entitled "High speed compressor" and filed May 12, 1930. The present application is a continuation in part of this prior application.

In the present invention, just as in my prior one, I utilize one or more cylinder blocks that are free to oscillate to compensate for the angular variations of a power driven piston. In the prior application, I have shown how the compressor, during the starting period, is unloaded by opening the outlet port of the cylinder to a casing that encloses the mechanism, and that is subjected to intake pressure. The opening of this port is accomplished by permitting the cylinder block to move relatively to another member which is in contact with it, thereby rendering the outlet discontinuous. However, when the compressor is in operation, use was made in the prior application, of a centrifugal governor device that exerted a sealing pressure between the member and the cylinder block.

It is one of the objects of my present invention to secure the unloading function in a simpler manner; for example, by the use of the pressure of the compressed gas, which is low until the compressor is in full operation.

It is another object of my invention to improve in general the mechanical structure of the device, and to incorporate the separator of the oil and gas with the compressor mechanism.

It is still another object of my invention to make it possible to prevent flooding of the compressor, such as may happen when the evaporated refrigerant is too rapidly drawn out of the expansion coils.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a schematic diagram showing the compressor as utilized in a refrigerating system;

Fig. 2 is a horizontal section of the compressor mechanism taken along plane 2—2 of Fig. 5;

Fig. 3 is a vertical section of the compressor mechanism taken along plane 3—3 of Fig. 2;

Fig. 4 is a front elevation of a compressor mechanism showing the oil separator partly in section supported thereon;

Fig. 5 is a side view of the compressor and the oil separator; and

Fig. 6 is an enlarged sectional detail showing a modified form of the invention.

In Fig. 1, the compressor mechanism 11 is shown in conjunction with a refrigerating system. This compressor, in this instance, has a horizontally arranged shaft 12 adapted to be power driven, as by an electric motor 13. The electric motor 13 as well as the compressor 11 can be appropriately supported on a horizontal base 14.

The refrigeration takes place in an expansion space 15 from which the evaporated refrigerant in the form of a gas is conducted by way of connections 16 and 17 to the inlet of the compressor 11. Disposed in the connections 16 and 17 there is a check valve 19 for preventing reverse flow of the gas through these connections from compressor 11 into space 15. As explained hereinafter, the outlet from this compressor extends into the oil separator 18 supported above the compressor 11. In the oil separator the compressed gas is freed from most of the oil and then flows by way of a connection 20 to a condenser 21. This condenser can be of any conventional form, such, for example, as is used in an automobile radiator, past which a cooling draft of air is drawn or blown, as by the aid of a fan 22 driven by the motor 13.

The liquified refrigerant in the condenser 21 can then pass by way of connection 23 to a valve 24. This valve may be either an expansion valve or a float valve supplying the refrigerant by way of connection 25 to the expansion space 15.

Here the refrigerant is vaporized and absorbs heat, and the cycle is then repeated.

The compressor 11 is of the reciprocating type and in this instance there are two reciprocating mechanisms operated by the shaft 12, each mechanism including a piston and a cylinder. Before proceeding with the description of the compressor mechanism, an explanation of the mode in which a fluid tight casing is formed around the entire mechanism can now be set forth.

The casing, as shown most clearly in Fig. 2, includes the two halves 26 and 27. These two halves are flanged as indicated at 28, 29, and interposed between the flanges is a central partition plate or member 30. The three members 26, 27 and 30 can be appropriately connected together in a fluid tight manner as by the aid of bolts or screws 31 (Figs. 3, 4 and 5). Appropriate foot members 32 are formed on the members 26, 27 and 30 to support the entire compressor casing on the base 14.

The central partition or wall 30 is utilized to accommodate some of the compressor ports, as well as to support, on either side thereof, a cylinder block in the manner to be now described.

The cylinder blocks 33 and 34 (Figs. 2 and 3) are shown as having a cylindrical external configuration, the axis of which is at right angles to the axis of the cylinder space. In this way they can be accommodated in a saddle or support for slight oscillation. Since the cylinder block and its guides are similar for both blocks 33 and 34 it is necessary to detail the structure of only one of them. Thus cylinder block 33 is accommodated in a saddle 35 which has a cylindrical wall contacting with the exterior surface of the cylinder block 33. This saddle is joined to the central partition 30, to be supported thereby, as by the aid of a flange 36. This flange is held in accurate position by the dowel pins 37 and the bolts 38 (Fig. 3).

The axis of the cylinder space 39 is in general horizontal, and fitting therein is the main piston 40. This piston is shown as provided with a series of oil grooves 41, and the entire casing 26, 27, 30 is filled with oil to a level such as indicated at 42 (Fig. 3).

The piston 40 is arranged to be reciprocated by rotation of the shaft 12 which extends through the boss 43 as well as through the aperture 44 in the central partition 30. Appropriate packing can be provided in boss 43 to keep the enclosure substantially fluid tight. Carried on this shaft 12 is an eccentric 44' having its eccentricity such as to produce a full stroke of the piston 40. The eccentric 44' is journalled in the two part eccentric strap 45, one part of which is shown as integrally connected to the piston 40.

It is apparent that, as shaft 12 rotates, the eccentric working in the strap 45 will alternately urge the piston 40 into and out of the cylinder space 39. Since this piston is constrained to move only axially in this cylinder space, the cylinder block 34 will be oscillated slightly from side to side during a complete revolution of shaft 12.

The intake and discharge from the cylinder space 39 is controlled in this instance by a piston valve arrangement similar to that shown and claimed in my prior application. Thus arranged between the cylinder block 33 and the central partition 30 there is a valve cylinder block 46 having the same general configuration as the cylinder block 33. This block 46 is also supported in the saddle 35 and is in abutting relation with the block 33. The piston valve 47 is operated by its own eccentric 48 carried by shaft 12. The angular positions of the two eccentrics 44' and 48 are so chosen as to provide the desired cycle of valve actions.

Piston valve 47 can also be provided with oil grooves 49. It also includes a reduced portion 50 for forming an annular passageway for the gasses at certain definite periods of its operation.

The shaft 12 is supported in appropriate bearing bushings 51 and 52. These bushings are in turn supported in standards 53 and 54 formed integrally with the end walls 55 and 56 of the saddle member 35.

The inlet connection 17 is shown as being accommodated in an aperture 57 in the wall 30 (Fig. 2). This aperture 57 in turn communicates with a transverse aperture 58 extending completely through the central partition 30. The intake passageway continues from each side of the partition 30 through passageways 59 and 60 that are formed in the flange 36 of each saddle 35. This flange, as shown in Fig. 3, has an enlarged portion 61 to accommodate the right angled port 59 or 60.

The port 59 as well as port 60 leads directly into the cylinder space 62, 63 of the two piston valve blocks 46. During the intake period, when the compressor is pulling gas from expansion space 15, the cylinder space 62 is in communication with the main cylinder space 39 by way of the apertures 64 and 65 formed respectively in the blocks 33 and 46. As in my prior application these apertures are elongated (Fig. 3) in order to ensure communication between the two cylinders when the relative angular positions of the two cylinders vary.

After the cylinder 39 has received its charge of gas to be compressed, the piston valve 47 moves downwardly and closes the passageway 65. Such closure continues until the gas is compressed to the desired amount; then upon further downward movement of the valve, the reduced portion 50 comes opposite the port 65. When that occurs, communication is established around this reduced portion 50 from port 65 into an outlet or discharge port 66 formed in cylinder block 46. This port is directly at the center of oscillation of blocks 33, 34, 46, as shown in Fig. 3, and communicates with a transverse aperture 67 in the wall or partition 30. Communicating with this transverse aperture 67 is a long passageway 68 (Fig. 3) which leads the compressed gas into the separator 18 in a manner to be shortly described.

The cycle of valve operations can be the same as described in my earlier application. The piston valves such as 47 are set a little in advance of the main pistons 40.

In order to ensure that the compressor mechanism will operate to compress the gas it is apparent that the cylinder blocks 33 and 46 must be pressed tightly together so as to maintain passageways 64 and 65 in close alinement and without any breaks. During the starting period, however, it is advantageous to relieve this pressure so that the cylinders may purge themselves of any accumulated oil and to relieve the motor 13 of a heavy starting torque. Therefore, the arrangement is such in this instance that some pressure must be created in the outlet ports before the blocks are pressed together. In other words, the device acts to unload the motor 13 during the starting period.

To accomplish this result I show cooperating with each block 33 and 34 a sylphon or expansible cell 69. This comprises a chamber having deeply corrugated walls acting as a bellows and made from thin sheet metal, such as copper. One end of the cell is open and communicates by way of passageways 70 and 71 with a connection 72 that leads into the outlet connection 68. This connection 72 is indicated diagrammatically in Fig. 2, and its ending in the passageway 68 is indicated in Fig. 3. The axis of expansion of cell 69 is the same as the axis of oscillation of the various cylinder blocks.

Passageway 71 is located in the end wall 55 of the saddle 35; and passageway 70, coacting therewith, is provided in a cover plate 73 to which the sylphon 69 is attached at its open end. The closed end of the sylphon bears against the block 33 through the intermediary of a ball bearing 74. One race of this ball bearing is seated in the block 33 and the other race is joined to the closed end of the sylphon. It is thus apparent that gas at a sufficient pressure must exist in passageways 68 and 72 to urge the blocks 33 and 46 closely together. This pressure does not exist at the starting period because the casing 26—27—30 is placed only under intake pressure. This is accomplished by the aid of a connection 75 (Figs. 2 and 5) which leads from the aperture 57 into a dome 76 placed on top of the compressor casing. Furthermore, the partition 30 is provided with other large through apertures such as 77 (Fig. 3) to establish communication between both compartments at each side of the partition 30. What has been said in connection with sylphon 69 in the left hand compartment is also true of the sylphon 69 in the right hand compartment, this compartment being merely a duplicate of the left hand compartment.

The various pistons 40, 47 and the like have a sufficient clearance in the cylinders to provide a continual flushing of the lubricant through these cylinders. The oil seals the piston and cylinder and keeps the surfaces clean. In this way gumming or sticking of the pistons is obviated and therefore there can be no overheating. This overheating is especially disadvantageous when using sulfur dioxide for a refrigerant. The oil also carries heat away with it as it passes through the cylinder into the outlet passageway 68 and is separated from the gas as before stated by the separator 18. The separation of the oil is quite important, for if the oil is permitted to pass with the refrigerant to the expansion space it will seriously affect the boiling temperature thereof in the refrigerating coils. It would also coat the inner walls of these coils and thus harmfully insulate them.

The separator 18, as shown most clearly in Figs. 4 and 5, is shown in this instance as including a T-shaped casing. This casing has a pair of feet 79, 80 resting on corresponding bosses on the compressor casing. Fluid tight heads 81, 82 and 83 are provided at each side and top of the casing. Outlet aperture 68 communicates through the foot 80 with an upright pipe 84 inside of the separator 18. The compressed gas and oil thus pass through this pipe 84 and the separated oil passes through the top head 83 into the connection 20, leading to condenser 21. The oil is separated substantially entirely by a series of screens 85 such as wire mesh screens, upon which may also be supported other porous material, such as chains 86. The oil separating from the compressed gas accumulates in a pool 87 in the bottom of the separator, and is intermittently discharged back into the compressor casing in a manner to be described. The return of the separated oil is accomplished through the passageway 88 leading from the foot 79 and substantially radially of the plate 30. One of the apertures 77 through this plate 30, communicates with the passageway 88 and passes the oil to both sides of the wall 30.

The oil 87 is purposely left in the separator for the purpose of cooling it somewhat; and the passage of the compressed gas (which is usually under superheat) out of the separator is retarded, giving it an opportunity to cool somewhat. The gas when it finally leaves the separator through connection 20 is in a more saturated condition and is more readily condensed when it finally reaches the condenser. This is due to the fact that the superheat is partially taken out to near the point of saturation in the separator 18.

As indicated in Fig. 4, the usual oil level in the separator is indicated at 89 which must be reached before a float valve operates to permit drainage through the connection 88. This float valve includes a pivoted member 90 carrying the float member 91 as well as a knob or connection 92. This connection 92 is embraced in a yoke 93 fastened to the end of a valve stem 94. This valve stem 94 is slidable in a stationary support 95 which also serves to support the member 90 pivotally. The valve stem 94, as is apparent, will be pulled toward the right when the float rises sufficiently. In doing so, it opens valve opening 96 in head 82, which is in communication with the passage 88 as by the aid of passages 97 and 98. The oil is then free to flow from the separator 18 through a port 99 in support 95, around the stem 94 and through the apertures or ports 97, 98, and 88. When the oil level has receded sufficiently the valve stem is moved to the left, closing the port 96, and the oil level is then permitted to rise as the oil separates from the compressed gas.

Since some small amount of gas is necessarily retained in the body of oil in the bottom of separator 18, this gas is also passed back into the compressor casing when the oil is passed from the separator. As this gas enters the casing it expands, since the separator is under high or discharge pressure and the casing is under low or suction pressure due to the use of the equalizer connection 75. The gas entering the casing is thus cooler and has a slight refrigerating effect on the oil passing into the casing, thus tending to cool the entire mechanism. This gas which is returned with the oil to the casing is immediately taken off through equalizer connection 75 to the suction intake 57 of the compressor. This excess of gas tends to raise the pressure in the housing or casing and will therefore be first used by the compressor in preference to the lower pressure gas coming from the expansion coils. The gas from the refrigerator is thus held back until the compressor casing is again at a pressure equal to that in the expansion coils. This prevents the compressor from being flooded and is automatic in action.

In lieu of the sylphon arrangement for holding the cylinder blocks 33 and 46 in contact, other types of pressure cells could be used. For example, when the compressor is operating at high pressure, an ordinary diaphragm arrangement can be substituted as in Fig. 6. In this case the ball bearings 74 interposed between the wall 55 and the block 33 extend through the wall 55 and can be acted on by a flexible diaphragm 100. This diaphragm forms one boundary of a confined space 101, the other boundary of which is formed by a housing 102, connected as by passage 103 with the outlet connection 68 of the compressor.

It may sometimes happen that the pressure of the gas in the outlet passageways rises to an undesirable or unsafe value. I provide a relief valve 104 in one or the other of the two outlet connections 72 which opens up into the low pressure region of the casing 26—27—30 when the pressure becomes excessive. In this way, the high pressure is relieved into a closed low pressure chamber, and it will stay relieved until the pressure is reduced to a definite value as determined by the setting of valve 104.

I claim:

1. In a compressor mechanism, means forming a closed compartment, said compartment having a wall separating the space into two chambers, a pair of cylinder blocks, respectively supported on opposite sides of the wall, pistons for said blocks, and a valve mechanism for each cylinder and also supported on the wall.

2. In a compressor mechanism, means forming a closed compartment, said compartment having a wall separating the space into two chambers, a pair of cylinder blocks, respectively on opposite sides of the wall, pistons for said blocks, and a valve mechanism for each block and supported on the wall, said wall having port passageways for providing an inlet and an outlet for the compressor.

3. In a compressor mechanism, a cylinder block, said block having an outlet port, a member contacting with said block and forming a continuously alined outlet passageway with said port, and means responsive to outlet pressure for urging the member and the block together.

4. In combination, a compressor mechanism for compressing a refrigerant gas, an enclosure for said mechanism, said mechanism having an inlet and an outlet, as well as a fluid connection from the enclosure to the inlet, an oil and gas separator in connection with the mechanism, an oil connection between the enclosure and the separator, and a connection from the outlet to the separator above the oil level therein.

5. In a compressor mechanism, a cylinder block, a support for said block for permitting said block to oscillate about an axis transverse to the cylinder axis, a piston for the cylinder, means for causing reciprocation between the piston and the cylinder, a member defining with the aid of the block, an outlet for the cylinder, and a device urging the member and block together and responsive to the outlet pressure.

6. In a compressor mechanism, a cylinder block, a support for said block for permitting said block to oscillate about an axis transverse to the cylinder axis, a piston for the cylinder, means for causing reciprocation between the piston and the cylinder, a member defining with the aid of the block, an outlet for the cylinder, a device urging the member and block together and responsive to the outlet pressure, and a fluid tight closure for accommodating any fluid that may escape from the outlet when the pressure is released.

7. In a compressor system having a compressor mechanism that is freely lubricated, and that has an inlet and an outlet passageway, for respectively taking in and passing out a refrigerant gas, the process of ensuring against flooding of the compressor, which comprises retaining a portion of the gas outside the compressor returning said retained portion of the gas at intervals to the inlet, and opposing the pressure of this gas against the pressure in the space from which the refrigerant passes to the inlet.

8. In a compressor system for a refrigerant gas, said system having a casing which is partly filled with lubricant and also having an inlet and an outlet, the process which comprises compressing the gas entering the inlet from an evaporation space, separating lubricant from the compressed gas, collecting the lubricant, passing the collected lubricant intermittently to the casing, and opposing the resultant gas pressure in the casing to that of the gas coming from the evaporation space.

9. In a compressor mechanism, a fluid tight casing, a cylinder block in said casing, means forming an inlet to the cylinder, said inlet being in communication with the interior of said casing, a member contacting with said block and forming with the block an outlet passageway from the cylinder to the exterior of the casing, and means responsive to outlet pressure for urging the member and block together, whereby upon reduction of said pressure the cylinder outlet is placed in communication with the casing interior.

10. In a compressor mechanism, a cylinder block, a member contacting with said block and forming an outlet passageway from the cylinder, means responsive to outlet pressure for urging the member and the block together, and a fluid tight closure around the member for preventing the escape of fluid when the pressure is released, and means for placing said closure under substantially intake pressure.

11. In a compressor mechanism, a cylinder block, said block having an outlet port, a member contacting with said block and forming a continuously alined outlet passageway with said port, means responsive to outlet pressure for urging the member and the block together, means forming a fluid tight space around the member and the block, and means for placing said space substantially under intake pressure.

12. In a compressor system having a compressor mechanism with an inlet and an outlet for respectively taking in and passing out a refrigerant gas, as well as a casing that encloses the mechanism and which is partly filled with lubricant, said casing being in communication with the inlet, the process which comprises discharging a mixture of refrigerant and lubricant through said outlet into a chamber maintained at a pressure above the pressure in said casing, partly separating the gas from the lubricant in said chamber whereby some gas is retained in the oil, discharging the separated gas from said chamber, and returning the mixture of oil and gas to the casing to permit the gas in the mixture to expand.

WILFRED FOURNESS